United States Patent
Michel et al.

(10) Patent No.: US 9,334,471 B2
(45) Date of Patent: May 10, 2016

(54) METHOD FOR ACCELERATED FERMENTATION AND DEVICE FOR MIXING A TANK CONTENT

(75) Inventors: Rudolf Michel, Bamberg (DE); Thomas Wünsche, Büchen (DE); Daniel Kontny, Wentorf (DE)

(73) Assignee: GEA BREWERY SYSTEMS GMBH, Buchen (DE)

( * ) Notice: Subject to any disclaimer, the term of this patent is extended or adjusted under 35 U.S.C. 154(b) by 225 days.

(21) Appl. No.: 13/700,493

(22) PCT Filed: May 27, 2011

(86) PCT No.: PCT/EP2011/058718
§ 371 (c)(1),
(2), (4) Date: Dec. 13, 2012

(87) PCT Pub. No.: WO2011/147958
PCT Pub. Date: Dec. 1, 2011

(65) Prior Publication Data
US 2013/0224358 A1 Aug. 29, 2013

(30) Foreign Application Priority Data

May 28, 2010 (DE) .............................. 102010029469
Sep. 13, 2010 (WO) ................. PCT/EP2010/005602

(51) Int. Cl.
*B01F 5/10* (2006.01)
*C12C 11/00* (2006.01)
(Continued)

(52) U.S. Cl.
CPC ............... *C12C 11/00* (2013.01); *B01F 5/0212* (2013.01); *B01F 5/043* (2013.01); *B01F 5/0413* (2013.01);
(Continued)

(58) Field of Classification Search
CPC ...... B01F 5/0413; B01F 5/0428; B01F 5/043; B01F 2215/0427; B01F 5/0212; B01F 5/10; B01F 5/106
USPC ............................ 366/162, 163, 163.2, 173.2
See application file for complete search history.

(56) References Cited

U.S. PATENT DOCUMENTS 486,339 A * 11/1892 Johnston ......................... 162/65
923,571 A * 6/1909 Paterson ........................ 366/137
(Continued)

FOREIGN PATENT DOCUMENTS

DE 197 40 319 6/1998
DE 198 07 558 10/1998
(Continued)

*Primary Examiner* — Tony G Soohoo

(57) ABSTRACT

The present invention relates to a method for an accelerated fermentation in a fermentation tank 2 with at least a tank cone 2a and a connection flange 4, in particular for beer production. The method comprises the steps: a) sucking in of fermentation fluid $M_1$ from the tank 2 via a first circulation pipe 40 by means of a circulation pump 30; b) inducing of the drive fluid $M_1$ that is now pumped by the circulation pump 30 via a second circulation pipe 50 in a mixing member 10 that is arranged within the tank cone 2a at a height L of 350 mm-1800 mm between the bottom edge of the connection flange 4 and the bottom edge of the mixing member 10; and c) generating of a jet directed upwards and exiting through an outlet opening 18 of the mixing member 10, so that the yeast cells stay for a longer time in suspension in the tank 2 by means of an in such a way improved convective current. The invention relates moreover to a corresponding device.

8 Claims, 3 Drawing Sheets

(51) Int. Cl.
*B01F 5/02* (2006.01)
*B01F 5/04* (2006.01)
*C12C 11/02* (2006.01)
*C12C 13/00* (2006.01)

(52) U.S. Cl.
CPC . *B01F 5/10* (2013.01); *B01F 5/106* (2013.01); *C12C 11/003* (2013.01); *C12C 11/02* (2013.01); *C12C 13/00* (2013.01); *B01F 2215/0068* (2013.01); *B01F 2215/045* (2013.01); *B01F 2215/0427* (2013.01); *B01F 2215/0477* (2013.01)

(56) References Cited

U.S. PATENT DOCUMENTS

| | | | | |
|---|---|---|---|---|
| 1,026,578 | A * | 5/1912 | Hammond | 366/137 |
| 1,309,267 | A * | 7/1919 | Westad | 162/249 |
| 1,647,473 | A * | 11/1927 | Rushmore | 239/304 |
| 1,905,731 | A * | 4/1933 | McKee | 162/61 |
| 2,432,175 | A * | 12/1947 | Schmidt | 366/134 |
| 2,509,288 | A * | 5/1950 | Brochner | 366/160.2 |
| 2,545,640 | A * | 3/1951 | Aitken | 169/45 |
| 2,577,797 | A * | 12/1951 | Moyer | 366/136 |
| 2,795,403 | A * | 6/1957 | Mead | 366/107 |
| 3,166,020 | A * | 1/1965 | Cook | 417/198 |
| 3,233,874 | A * | 2/1966 | Betulius | 366/167.1 |
| 3,565,404 | A * | 2/1971 | Reid et al. | 366/137 |
| 3,661,364 | A * | 5/1972 | Lage | 366/136 |
| 4,325,642 | A * | 4/1982 | Kratky et al. | 366/137 |
| 4,332,484 | A * | 6/1982 | Peters | 366/137 |
| 4,618,426 | A * | 10/1986 | Mandt | 210/620 |
| 4,671,892 | A * | 6/1987 | Bereiter | 252/367.1 |
| 4,863,277 | A * | 9/1989 | Neal et al. | 366/137 |
| 5,470,459 | A * | 11/1995 | Barrington et al. | 210/149 |
| 5,529,392 | A * | 6/1996 | O'Donnell et al. | 366/155.1 |
| 5,615,950 | A * | 4/1997 | Frei et al. | 366/173.1 |
| 5,735,600 | A * | 4/1998 | Wyness et al. | 366/101 |
| 5,762,416 | A * | 6/1998 | LeSire | 366/136 |
| 5,899,560 | A * | 5/1999 | Byers | 366/137 |
| 6,065,860 | A * | 5/2000 | Fuchsbichler | 366/136 |
| 7,134,781 | B2 * | 11/2006 | Roberts et al. | 366/137 |
| 7,726,870 | B1 * | 6/2010 | Lott | 366/107 |
| 7,988,348 | B2 * | 8/2011 | Morgenthaler | 366/137 |
| 8,118,477 | B2 * | 2/2012 | Lamon | 366/173.2 |
| 8,162,531 | B2 * | 4/2012 | Crump | 366/137 |

FOREIGN PATENT DOCUMENTS

| | | |
|---|---|---|
| DE | 198 07 558 A1 | 10/1998 |
| DE | 200 00 841 | 3/2000 |
| FR | 2 187 398 | 1/1974 |
| GB | 798983 * | 7/1958 |
| JP | 53 016963 | 2/1978 |
| WO | 98/45401 | 10/1998 |

* cited by examiner

METHOD FOR ACCELERATED FERMENTATION AND DEVICE FOR MIXING A TANK CONTENT

1. TECHNICAL FIELD

The invention relates to a method for the accelerated fermentation in a fermentation tank, in particular in beer-production, as well as to a device for mixing the tank content, in particular in food-, beverage- and pharmaceutical-industries.

2. PRIOR ART

The fermentation and the succeeding maturation of beer in the brewery is carried out commonly in containers made of CrNi-steel, in particular in so-called cylindro-conical fermentation tanks (CCFT). For the control of temperature during the process, these containers are provided with coolable elements in the frame and in the cone. For cleaning matters, fixed or moveable elements (like for instance spray balls or target jet cleaners) are attached in the upper area of the tank. By means of these elements, the tank is cleaned, and if necessary, also disinfected after the end of the process.

During the filling of the tank, a balanced dosing of active yeast cells and an adapted ventilation of the gyle (fermentation substrate) is ensured. In the tank the yeast initially runs through an aerobic progeny-phase and then goes on in the anaerobic fermentation. Besides alcohol, also carbon dioxide is generated from the sugar of the gyle. Herein, the carbon dioxide passes over into a suspension for about 10%, the remaining 90% are liberated as $CO_2$-gas. In the cylindro-conical fermentation tank the rising $CO_2$-bubbles effect a current in the central column upwards and consequently in the wall area downwards. This current supports the convective current that is directed downwards and that is generated at the wall by cooling. In an early stage of the fermentation process, also sedimentation of the yeast cells begins in the fermentation tank, i.e. the yeast cells sediment in particular induced by the gravitation in the direction of the tank floor.

The entire process of fermentation and maturation in beer production is commonly separated in four elemental steps:
- the main fermentation: Here, the main part of the extract is fermented (extract means in general the sum of all substances in suspension in the gyle; these are mainly carbohydrates, nitrogen-substances, polyphenols, bitterns and mineral nutrients);
- the warm-maturation: Here, amongst others, the lead substances, the so called vicinal diketones (VDK), that comprise in particular diacetyl and pentadion are broken down beyond a predetermined taste-threshold of, for instance, 10 ppm;
- the cooling from the fermentation temperature (about 15-22° C. for top-fermented beers and respectively 8-16° C. for bottom-fermented beers) to the storage temperature (essentially<2° C.);
- the cold-storage- or cold-maturation-phase: herein, the sedimentation of the yeast cells and other undesired tarnish particles as well as the drop out of sedimentable substances by under running of solubility thresholds (for instance albumen, tanning agents etc.).

In order to influence the process, the brewer has essentially the parameters pressure and temperature. Thereby, common process times of about 14 days (4 days main fermentation+4 days warm storage+2 days cooling+4 days cold storage) result.

In order to be able to use the available tank equipment more effectively, there is a need for accelerating the above mentioned processes, so that as a result the holding time of a fermentation tank can be reduced and thus, the production capacity can be improved in the fermentation- and storage-cellar-area.

In order to shorten the fermentation- and maturation-process in beer production, in general the in the following shortly discussed approaches are used:

Modification of the fermentation parameters pressure and temperature (increasing the temperature in general also means increase of the pressure):

Due to the sensible metabolism of the yeast, this processing leads to modifications in the taste profile and in the character of the beer. Thus, the variation of parameters is limited to narrow borders by the physiology of the yeast, and the achievable savings in time are low.

Rising the concentration of the wort concentration in the fermentation substrate:

By the fermentation of worts with a concentration in the range of 14-17 weight percent (wt-%), already substantial tank volumes can be saved. But this method is limited by the physiology of the yeast. The currently industrially used yeast microbial strains ferment all-malt-worts of up to 18 wt-% and wort with raw fruit portions of up to 20 wt-%.

Change from the batch-wise and respectively discontinuous production method to continuous methods:

Continuous fermentation- and maturation-methods are in general known and are extensively described in the technical literature and in the patent literature. However these methods do not have a significant industrial meaning due to the possible hygienic risks and some unsolved problems in the field of biomass-handling.

Mixing of the tank content:

When the naturally upcoming current in the tank, as described above, is improved, more yeast cells stay in suspension. Therefore, the sedimentation is reduced and the material conversions in the tank go on with higher velocity due to the higher yeast cell number in suspension—and therefore in optimum contact with the substrate.

In U.S. Pat. No. 3,814,003, for instance, a method is described in which the natural convective current inside the tank shall be supported by the blowing in of carbon dioxide gas by means of injection lances or an injector ring. However, this method requires an additional use of carbon dioxide gas.

Furthermore, a method is known from EP 1 324 818 B1, wherein the target jet cleaner that is installed in the upper area of the tank cap is used for mixing matters. Herein, the mixer is located at a slightly lower position in the tank and the fermentation substrate is pumped by a pump in the circulation. Due to the design of the target jet cleaner very high loss of pressure is caused. The energy intake in the system fermentation tank is substantial so that the pump has to be provided with a correspondingly large motor. Moreover, the mixing effects that are caused by the target jet cleaner is insofar problematic, since the natural convective current is disturbed by the jet impact.

Furthermore, it is known in the beverage industry to locate injector devices inside the tank for mixing the tank content and to direct quantities of the tank content by means of a pump through the injector. Therefore, a current is generated in the tank, which causes the mixing of the tank content. However, for the known injectors, the mixing effect is low and strong pumps are needed to circulate the entire tank content.

DE 197 40 319 A1 describes an arrangement for carrying out a method for accelerated yeast progeny in the brewing process, with a tank-like assimilator for containing a wort-yeast-suspension which is provided with an inlet pipe, an outlet pipe and a surrounding pipe connecting one of these two pipes with a circulation pumping device and a device for oxygen adding. A static mixer is provided in the inlet pipe, in which the device for oxygen adding flows in. Moreover, in the outlet area of a cone-shaped bottom portion of the assimilator, a fluid-jet-mixing-injector is arranged, wherein its injector is connected to the inlet pipe. The outlet of the cone-shaped bottom portion leads into the outlet pipe. From DE 198 07 558 A1 and respectively from WO 98/45401, a similar arrangement for the accelerated fermentation in cylindro-conical fermentation tanks in the production of beer is known. This one comprises a cylindro-conical fermentation tank for storing the fermentation substrate and an outlet- and inlet-pipe connected to the cone-shaped bottom portion of the fermentation tank. The outlet- and inlet-pipe are connected to each other via a circulation pipe, in which a circulation pump device is arranged. In addition, in the outlet area of the cone-shaped bottom portion of the fermentation tank, a fluid-jet-mixing-injector is arranged, wherein its injector is connected to the inlet pipe. The outlet of the cone-shaped bottom portion leads in return into the outlet pipe. In the above mentioned arrangements, the fluid-jet-mixture injector is always arranged very deep inside the tank cone, so that the suction area of the pump and the suction area of the injector are located very close to each other. However, this effects that an insufficient suction stream is generated at the injector, since the pressure at the lateral openings of the injector is too low and thus, not enough fluid can be sucked in. In this context, it is exemplarily referred to FIG. 3 of DE 197 40 319 A1, which shows the disadvantageously arranged injector. The area in which the suction stream S and the drive stream T are generated from the convective stream K is herein so narrow that at this location, very high current speeds come up, by which the dynamic pressure at this location becomes so small that the "suction pressure" of the injector is not able to generate any substantial suction current. In other words: The suction pressure of the injector is lower than the dynamic pressure at the lateral openings of the injector, whereby no suction current can be generated. A higher arrangement of the injector inside the tank cone was declined up to now, because there was the fear that hereby, a too low yeast cell concentration would be sucked by the injector. Moreover, it was the desire, amongst others, also to keep the distance between a static mixer (for the oxygen dosing) and the injector as small as possible, in order to avoid a bubble coalescence on this path.

Thus, it is the object of the present invention to provide a method for the accelerated fermentation during the production of beer by which both, the energy intake in the fermentation tank can be reduced and the temperature homogeneity in the fermentation tank can be increased and with which moreover the natural convective current in the fermentation tank can be supported in an effective manner. Moreover, for hygienic reasons, the use of moving parts inside the fermentation tank is avoided. It is moreover the object of the invention to provide a device for mixing a tank content, which ensures in a simple manner an improved mixing of the tank content, which is less prone to dirt and which is less prone to abrasion. Moreover, it is in particular the object of the invention to provide an effective hydraulic decoupling of the suction area of the pump and the suction area of the injector.

3. SUMMARY OF THE INVENTION

The above-mentioned problems are solved by a method for the accelerated fermentation in a fermentation tank, in particular for beer production according to patent claim 1, as well as by a device for mixing a tank content according to patent claim 9.

In particular, the above-mentioned problems are solved by a method for an accelerated fermentation in a fermentation tank with at least one tank cone and a connection flange, in particular for beer production, comprising the steps: a) sucking in of fermentation fluid ($M_1$) from the tank via a first circulation pipe by means of a circulation pump; b) discharging of the drive fluid ($M_1$) that is now pumped by the circulation pump via a second circulation pipe into a mixing member that is arranged within the tank cone at a height (L) of 350 mm-1800 mm between the bottom edge of the connection flange and the bottom edge of the mixing member; and c) generating of a jet that is directed upwards which exits through an outlet opening of the mixing member, so that the yeast cells stay in suspension for a longer time in the tank by means of an in such a way improved convective current; as well as by a device for mixing the tank content with at least a tank cone and a connection flange, comprising: a. a mixing member that can be arranged in the tank cone; b. an inlet, which can be arranged at the outlet of the tank; c. a circulation pump; d. a first circulation pipe connecting the inlet with the circulation pump; and e. a second circulation pipe connecting the circulation pump with the mixing member; wherein f. the mixing member is arranged within the tank cone at a height (L) of 350 mm-1800 mm between the bottom edge of the connection flange and the bottom edge of the mixing member.

Due to the improved convective current in the tank, the yeast cells can stay in suspension for a longer time, but also already sedimented yeast cells can, at least partially, be brought into suspension again.

In a preferred embodiment of the method according to the invention, the mixing member is arranged within the tank cone at a height (L) of 375 mm-1650 mm, preferably of 400 mm-1500 mm, between the bottom edge of the connection flange and the bottom edge of the mixing member. In this manner, the hydraulic decoupling of the suction area of the pump and the suction area of the injector or the mixing member, respectively, can be designed more efficiently.

In a further preferred embodiment of the method according to the invention, the circulation time is 3 h-12 h, preferably 4 h-10 h, per circulation. By the term circulation time, the quotient of the tank volume and the mixing volume flow is understood, in the present case:

$$\text{Circulation time} = \frac{V_T}{\dot{V}_{M12}}$$

The mixing volume flow out of the mixing member is calculated in the present case as follows:

$\dot{V}_{M12} \approx 3 \text{ to } 4 \times \dot{V}_{M1}$ with $\dot{V}_{M1}$=drive volume flow The mixing time of aqueous suspensions is defined for the present jet pumps as:

$$\text{Mixing time} \approx 0.3 \times \frac{V_T}{\dot{V}_{M12}}$$

The factor 0.3 results from the friction forces that were also shown in the prior art and which are generated by the impulse exchange with particles from the mixing volume flow with those from the tank volume.

Preferably, the drive volume flow ($M_1$) is 6 $m^3$/h-50 $m^3$/h, further preferred 8 $m^3$/h-41 $m^3$/h. In practice, thus, for example, a drive volume flow ($M_1$) of only about 8 $m^3$/h results for an average-sized tank (2660 hl useable volume) for 8 h circulation time. Even if a very large tank (10000 hl useable volume) and a somewhat faster recirculation pumping time of 6 h is assumed, only a drive volume flow of about 41 m³/h is achieved. These values are significantly lower than the values known from the prior art. In this way, on the one hand, significant energy saving can be achieved at the pump drive, whereby, at the same time, the yeast cells are exposed to a lower shear stress by circulation pumping. On the other hand, very good circulation- or mixing-times, respectively, can be achieved nevertheless. A further advantage of the comparably low drive volume flows lies in that no devices for the reduction of froth or froth alerting sensors, as they are commonly used in the prior art, are necessary any more, since, due to the lower drive volume flows, there is no longer a risk of an increased froth generation. Furthermore, due to the increased homogeneity of the tank content, a generation of "$CO_2$ nests" (increased $CO_2$ concentration at specific locations in the tank) is avoided in the product. From these "$CO_2$ nests", often the disadvantageous froth-over of the tank content is generated. It has to be mentioned as a further advantage that in classic cylindro-conical fermentation tanks, commonly, a riser space of about 20-25% of the gross volume has to be maintained during the fermentation, so that a possible froth formation does not lead to an overflow of the tank. With the aforementioned measures, this riser space can be possibly reduced and thus, the useable volume of the tank can be increased. This is an additional utilization benefit for the brewery, since herewith both, the fermentation tank capacity and the output can be increased without additional tanks—and without the corresponding high investments.

In another preferred embodiment of the device according to the invention, a completely welded module is used as mixing member, which is assembled from two (turned) machined parts, whereby a hygienic embodiment of the injector is generated by the pipe that is formed an a welded manner. Such a mixing member corresponds particularly well to the hygienic requirements in the brewery. Namely, no screw connection is needed anymore in order to screw the injector into the mixing member. Also, the connection of the mixing member with the (second) circulation pipe is preferably a welded connection. During the cleaning of the mixing member, it is possible to use a cleaning solution on all surfaces, whereby a particularly hygienic cleaning is possible. The currently known mixing members are in contrast realized with screws. As alternative, a screw design with corresponding seals might be possible, wherein the seals ensure that the thread is hermetically sealed. However, this is only acceptable in a limited manner, since on the one hand, the sealings are effected by aging and, on the other hand, the design is very complex.

In still another preferred embodiment of the method according to the invention, in step b), the drive fluid ($M_1$) that is now pumped by the circulation pump via the second circulation pipe is injected into the mixing member by means of a drive head, wherein the drive fluid ($M_1$) is mixed with further fermentation fluid ($M_2$) that is sucked by means of the underpressure generated by the injection of the drive fluid ($M_1$) via one or more inlet openings of the mixing member directly inside the mixing member, to a mixed jet ($M_{12}$) that flows upwards through the mixing member; and wherein, in step c), the mixed jet ($M_{12}$) that is directed upwards leaves through an outlet opening of the mixing member, so that the yeast cells stay in suspension for a longer time by the so improved convective current in the tank. Thereby, a more gentle treatment of the yeast is ensured and it is possible to use pumps with lower power.

In a further preferred embodiment of the method according to the invention, the mixing member is arranged in the tank in that the jet and respectively the mixed jet ($M_{12}$) in step c) leads essentially vertically. Thereby, the mixed jet is centrally directed upwards and thus comprises the same direction as the natural bubble column by the $CO_2$ generation, an additional support of the natural convective current in the tank is achieved in an effective manner.

In a preferred embodiment of the device according to the invention, the mixing member is arranged within the tank cone at height (L) of 375 mm-1650 mm, preferably of 400 mm-1500 mm between the bottom edge of the connection flange and the bottom edge of the mixing member. In this manner, in turn the hydraulic decoupling of the suction area of the pump and the suction area of the injector and respectively of the mixing member can be designed in an even more effective manner.

In a further preferred embodiment of the device according to the invention, the mixing member comprises: a drive head connected with the second circulation pipe; a mixing chamber surrounding the drive head with at least one inlet opening in order to suck fluid from the tank and to mix it with the drive fluid flowing through the drive head; and a diffuser arranged downstream in the mixing chamber which comprises an outlet opening in order to dispense the mixed fluids ($M_1+M_2$) into the tank. The drive fluid ($M_1$) flowing through the drive injector is taken from the tank content and generates a fast flowing current in the diffuser, which generates underpressure in the mixing chamber. By this underpressure, fluid ($M_2$) is poured from the tank into the mixing chamber through at least one suction opening, is mixed inside the mixing chamber and in the subsequent diffuser with the drive fluid and is dispensed through an outlet opening at the end of the diffuser again into the tank. Contrary to an injector that is commonly arranged inside the tank, here a suction of fluid from the tank to the inside of the jet pump is carried out, wherein in the mixing chamber a mixing under compulsion of this sucked fluid with the drive fluid is then effected. Thus, the mixing is substantially more intensive than it would be given by a mere generation of a current in the tank.

In a still further preferred embodiment of the device according to the invention, one or more valves are connected to the first circulation pipe. By these valves it is possible to carry out a hydraulic connection of the tank to pipes. It is possible to fill, to empty or to clean the tank via these valves. Furthermore, it is possible to provide different fluids that will then be mixed with each other in the tank by the device.

In another preferred embodiment of the device according to the invention, a completely welded module is used as mixing member, which is assembled from two (turned) machined parts, whereby a hygienic embodiment of the injector is generated by the pipe that is formed an a welded manner. Such a mixing member corresponds particularly well to the hygienic requirements in the brewery. Namely, no screw connection is needed anymore in order to screw the injector into the mixing member. Also, the connection of the mixing member with the (second) circulation pipe is preferably a welded connection. During the cleaning of the mixing member, it is possible to use a cleaning solution on all surfaces, whereby a particularly hygienic cleaning is possible. The currently known mixing members are in contrast realized with screws. As alternative, a screw design with corresponding seals might be possible, wherein the seals ensure that the thread is hermetically sealed. However, this is only acceptable in a limited manner, since on the one hand, the sealings are effected by aging and, on the other hand, the design is very complex.

In a further preferred embodiment of the device according to the invention, the inlet is built as hollow part through which the second circulation pipe extends into the inside of the tank.

According to this, there is only one connection of the device to the tank, namely at the very bottom end of the tank. The fluid is sucked through the hollow part at the very bottom end of the tank and is advanced by means of the pump through the second circulation pipe and through the hollow part in the tank. Here, it reaches the mixing member according to the invention and respectively the jet pump, which effects the mixing of the pumped fluid with a fluid from the tank.

4. SHORT DESCRIPTION OF THE FIGURES

In the following, exemplary embodiments of a device according to the invention for carrying out the method according to the invention are described by means of the accompanying figures, in which.

5. DETAILED DESCRIPTION OF PREFERRED EMBODIMENTS

In the following, preferred embodiments of a device according to the invention to carry out the method according to the invention is described in detail. Particular features of an embodiment can be combined with features of other embodiments. In all embodiments, the same reference signs were used for corresponding features.

Figure 1:
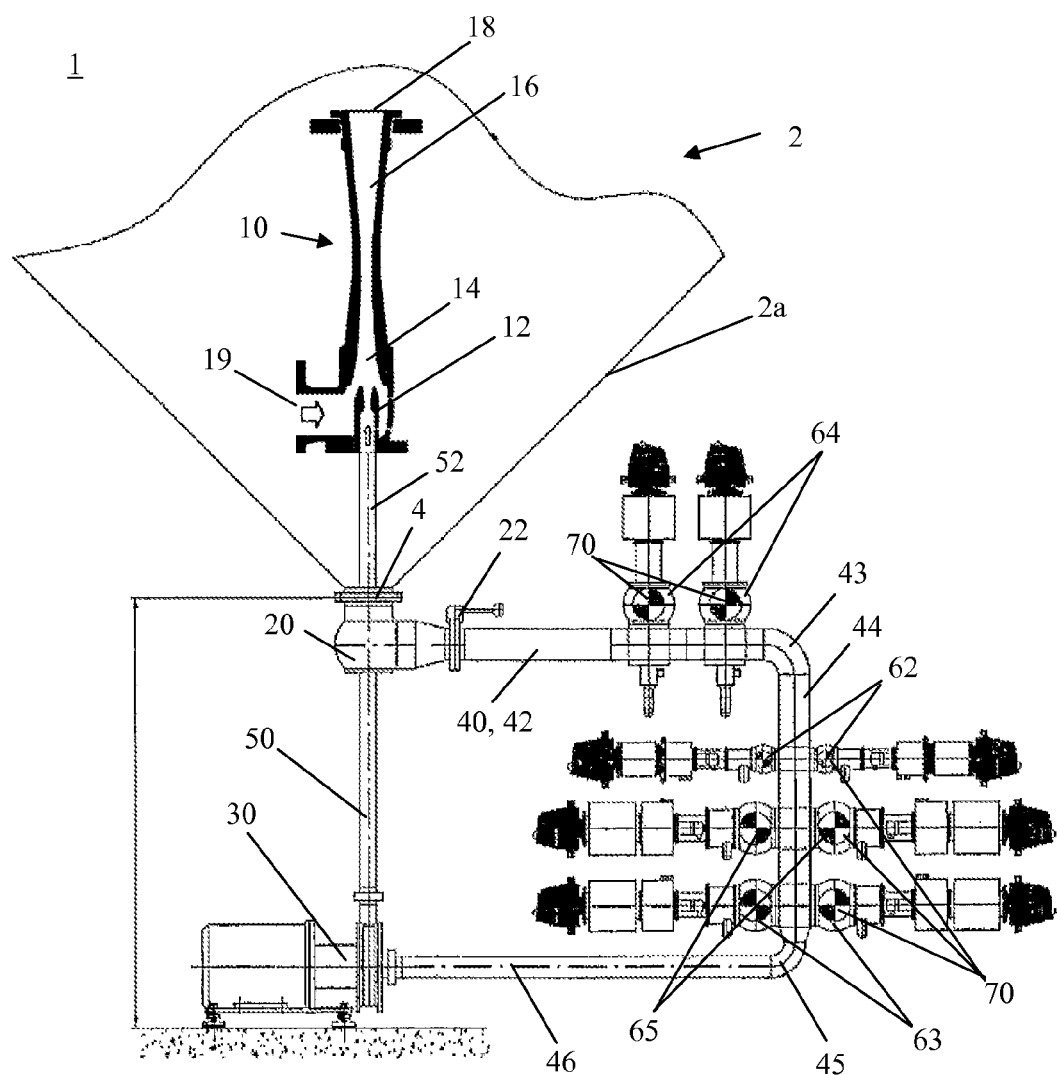
FIG. 1 shows a schematic side view of a first embodiment of a device for carrying out the method according to the invention with a cross-sectional view of a first mixing member.
Figure 2:
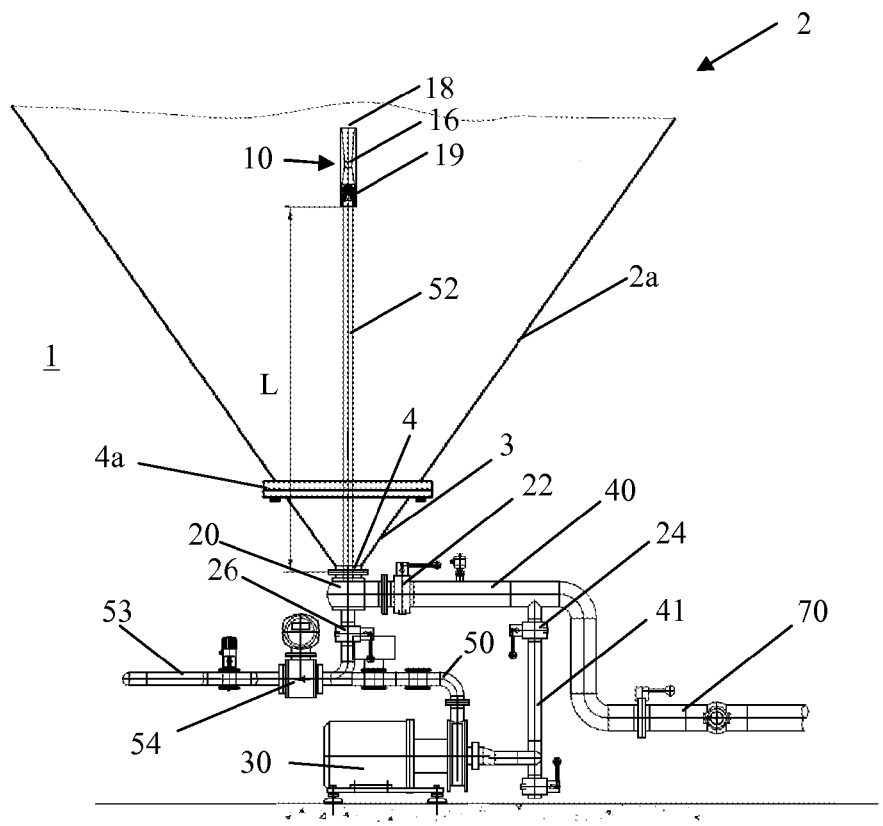
FIG. 2 shows a schematic side view of a second embodiment of a device according to the invention to carry out the method according to the invention with a second mixing member.
Figure 3:
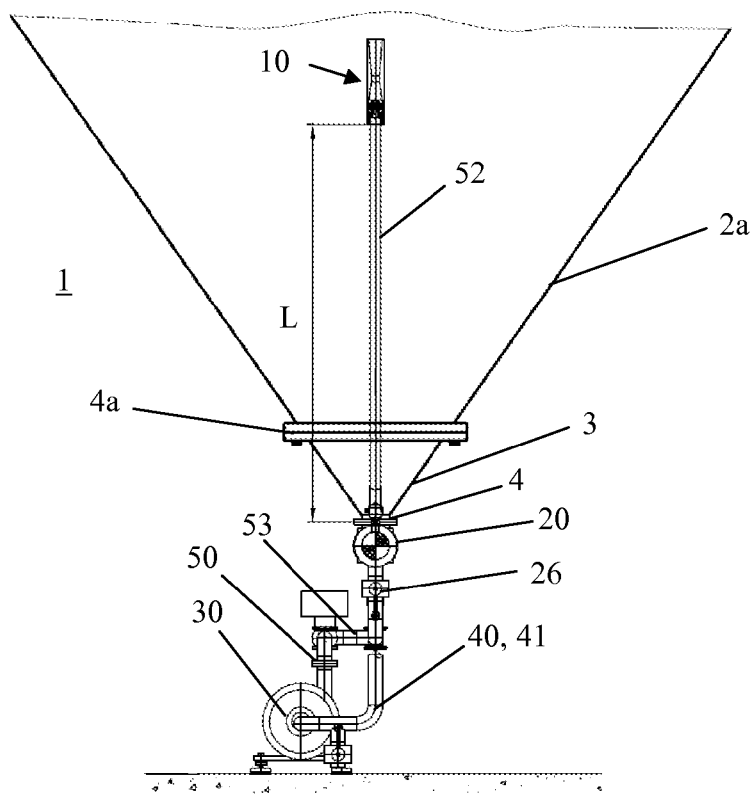
FIG. 3 shows the device of FIG. 2 in a front view.

FIGS. 1-3 show schematic side and front views, respectively, of a device 1 according to the invention to carry out the method according to the invention, wherein FIG. 1 shows a first embodiment and FIGS. 2 and 3 show a second embodiment. In these figures, the bottom tank cone of a tank 2 is schematically shown. The tank 2 is, for example, a cylindro-conical tank (CCT) of a brewery construction, in particular a fermentation tank (CCFT).

As shown, a hollow-part-shaped inlet 20 is connected to a connection flange 4 at the lower end of the tank cone 2a (FIG. 1) and of the cone-man-hole 3 (FIGS. 2 and 3), respectively, so that fluid, or another medium, can enter the device 1 from the tank 2 through the inlet 20. At the inlet 20, a flap valve 22 is connected by which a fluid entrance into the device 1 can be blocked, for instance for maintenance matters.

From inlet 20, the fluid moves in a first circulation pipe 40 connecting the inlet 20 with a circulation pump 30. The circulation pump 30 is preferably an electrically driven pump that pumps the fluid coming from the inlet 20 via a second circulation pipe 50 into the tank 2. The second circulation pipe 50 extends through the hollow part of the inlet 20, but is not hydraulically connected with it. By this arrangement, a connection possibility of the device 1 with the tank 2 results, which is optimum with respect to current matters and also to mechanical matters. In particular for the connection of the device 1 to the tank 2, only one opening is used, namely the always present lower connection flange 4 of a cylindro-conical tank. Accordingly, every common cylindro-conical tank can be equipped or respectively upgraded with a device 1 for mixing the tank content.

The second circulation pipe 50 extends over a specific length L (cf. FIGS. 2 and 3) in the lower area inside the tank 2, wherein the area 52 of the second circulation pipe 50 extending inside the tank may comprise a length L of 350 mm-1800 mm, preferably 375 mm-1650 mm and even more preferred of 400 mm-1500 mm. In a preferred embodiment, a length L of 1000 mm or of 1200 mm is used.

At the upper end of the area 52 a mixing member in form of a jet-pump 10, respectively, is connected to the second circulation pipe 50. By the design of the area 52 of the second circulation pipe 50 (height L, measured from the bottom edge of the (lower) connection flange 4 to the bottom edge of the mixing member 10), the mixing member 10 can be arranged at an advantageous height inside the tank 2.

The mixing member 10 comprises a drive head 12 that is connected with the second circulation pipe 50. The drive head 12 injects the fluid which is pumped by the circulation pump 30 (the so called "drive fluid") into a mixing chamber 14 surrounding the drive head 12. The mixing chamber 14 comprises in its lower area an inlet- and respectively a suction-opening 19, through which fluid from the tank can also flow into the mixing chamber 14. By the flowing out of drive fluid through the drive head 12 inside the mixing chamber 14, an underpressure is generated effecting fluids to stream directly from the tank through these suction openings 19 into the mixing chamber.

In the mixing chamber 14, the drive fluid flowing out of the drive head 12, is then mixed with the fluid flowing in directly from the tank 2 through the suction openings 19. Downstream of the mixing chamber 14, a diffuser 16 is arranged. Through the narrowing cross section of the diffuser 16, the suction effect of the jet pump 10 for fluid from the tank is even amplified. The diffuser 16 leads into an outlet opening 18 through which the mixed fluids flow out into the tank 2.

The mixing member 10 serves, on the one hand, to enter the fluid that was sucked through the inlet 20 into the tank 2 in order to generate a current inside the tank 2 and respectively to support a current inside the tank 2. On the other hand an underpressure is generated inside the mixing member 10 by the flowing of the pumped fluid (drive fluid) into the mixing member 10, which directly sucks further fluid out of the tank 2. This mixes itself with the drive fluid and enters through the outlet opening 18 into the tank 2. Thus, the mixing of the tank content is carried out both outside the jet pump 10 in the tank 2 and inside the jet pump 10 itself.

The device of the second embodiment according to FIGS. 2 and 3 differs from the first embodiment according to FIG. 1 in the three dimensional design of the jet pump 10, the first circulation pipe 40 and the second circulation pipe 50.

The jet pump 10 of the second embodiment is smaller and slimmer than the one schematically shown in FIG. 1, but comprises the same components and has the same function. By the smaller and slimmer form, the jet pump 10 can be inserted without any problems through the connection flange 4 into the lower area of the cone-man-hole and can be assembled at the height L. Also this jet pump 10 comprises a drive head 12, a mixing chamber 14, at least one suction opening 19, a diffuser 16 and an outlet opening 18 to dispense the mixed fluids into the tank 2. The mixing member and the jet pump 10, respectively, are each arranged above the cone-man-hole 3, which commonly has a height of about 350 mm-450 mm, preferably about 400 mm as well as an upper flange 4a (e.g. DN450) and a lower flange and connection flange 4 (for instance DN100-125), respectively.

In the embodiment of FIG. 1, the first circulation pipe 40 is preferably formed in an U-shape and comprises a first straight arm 42, which is horizontally arranged starting from the inlet 20. The first arm 42 is connected via a 90°-arch 43 with a second straight arm 44, which is substantially vertically arranged. This second straight arm 44 leads via a 90°-arch 45 into a third straight arm 46, which again is arranged essentially horizontally and leads to a suction opening of a circulation pump 30. The second circulation pipe 50 is essentially straight and vertically upwards and is directly connected to an outlet opening of the circulation pump 30.

Both at the vertically arranged arm 44 and at the horizontally arranged arm 42 of the first circulation pipe 50, mixing-save valves are arranged, preferably double-seated valves 62, 63, 64, 65. As shown, the valves 62, 63, 64, 65 each consist of two pairs of opposing valves. Thereby, an especially space-saving arrangement of the valves at the vertical arm 44 of the first circulation pipe 40 results. As shown, the valve housings are directly connected to the wall of the first circulation pipe 50. It is also possible that the valve housings of the shown double-seated valves 62, 63, 64, 65 are part of the second circulation pipe 50. This is micro-biologically advantageous, since then no recesses or other cavities exist between the first circulation pipe and the valves in which fluids could accumulate and settle. Accordingly, the fluid inside the device 1 is always in motion and in material exchange with the content of the tank 2.

Via the valves 62, 63, 64, 65, preferably horizontally arranged pipes 70 are connected to the device 1 and thus to the tank 2. Via these pipes 70, the tank 2 can be filled with different fluids and can be emptied. Furthermore, it is possible, during the cleaning of the inner space of the tank, to direct a partial stream of the cleaning fluid via the circulation pump to the device 1 in order to ensure an effective cleaning of the entire device 1 in that manner.

If multiple tanks 2 with devices 1 are arranged in a row one after the other, then the pipes 70, which are connected to the valves 62, 63, 64, 65 are able to connect the tanks in such a manner that each tank 2 can be connected with corresponding pipes 70. Thereby, it is possible to build an advantageous tank storage system that is statically piped and can operate without any further valve matrices, distributor panels or pipe arc panels for interconnecting the tanks.

In the second embodiment according to FIGS. 2 and 3, the first circulation pipe 40 consists of a straight piece of a stronger designed pipe 70 also serving as inlet pipe to the tank 2. Between the first circulation pipe 40 and the inlet 20, a flap valve 22 is arranged. Furthermore, a second flap valve 24 is connected to the pipe 70 that is connected to the continuation 41 of the first circulation pipe 40 extending to the circulation pump 30. Since a smaller volume flow for the mixing of the fluids in tank 2 is needed than for the filling or the emptying of tank 2, the continuation 41 of the circulation pipe 40 is designed in smaller dimensions than the pipe 70.

From the circulation pump 30, the circulating fluid is pumped via a second circulation pipe 50 to the jet pump 10. The second circulation pipe 50 extends initially from the pump 30 vertically upwards and then goes over into a horizontally arranged, essentially U-shaped arc 53 to which valves or measurement devices 54 can be connected. For instance, a measurement device 54 for measuring the yeast content in the circulated fluid can be connected to the circulation pipe 50. At the end of the U-shaped arc 53, the second circulation pipe 50 goes over into an area extending vertically upwards through the inlet 20 and into the tank 2. Below the inlet 20, the second circulation pipe 20 can be separated by a further flap valve 26 from the area 52 in the tank 2, if desired.

Figure 4:
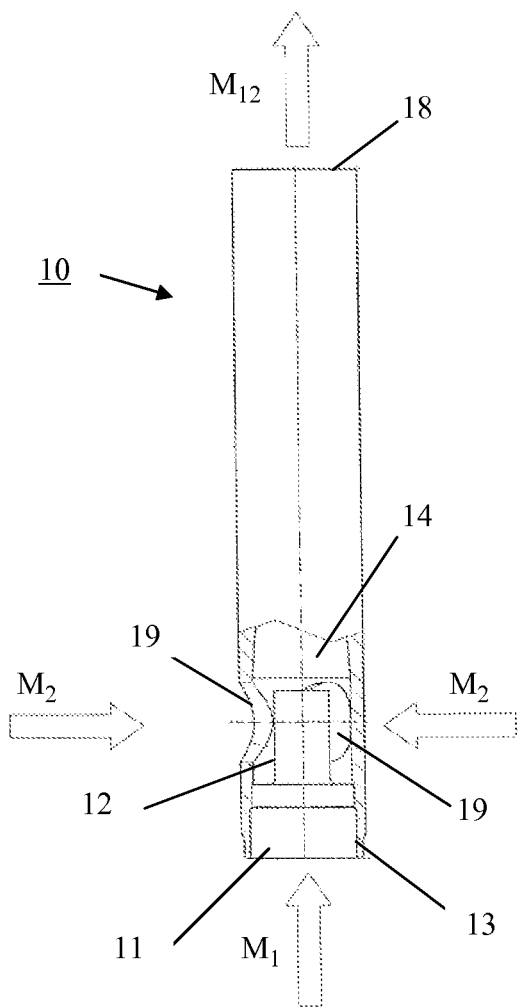
FIG. 4 shows a single view of a mixing member according to FIGS. 2 and 3 with indicated partial volume flows.

In FIG. 4, finally, the mixing member 10 is shown in detail. As in the embodiments according to FIGS. 2 and 3, here also the mixing member 10 is preferably in the form of a jet-pump, respectively. However, the mixing member 10 can also be realized as a Venturi-jet. The mixing member 10 comprises essentially a cylindrical shape with an inlet opening 11 at its downstream end, an outlet opening 18 at its upstream end as well as one or more laterally arranged inlet opening(s) 19.

The inlet opening 11 of the mixing member 10 can, as shown, be provided with an internal thread 13 by means of which the mixing member 10 can be threaded to a corresponding end of the second circulation pipe 50, so that the mixing member 10 can be assembled solidly in the tank cone 2a. The internal thread 13 is less sensitive to contaminations than an external thread. Also seals (not shown) can be provided sealing the thread hermetically. However, it is particularly preferred that the mixing member is realized as fully welded module, which is assembled of two (turned) machined parts. Also the connection with the second circulation pipe 50 is, particularly preferred, a welded connection. Downstream of the inlet opening 11 of the mixing member 10, the drive head 12 is arranged. The drive head 12 is commonly realized as an injector or as a piece of pipe with a smaller diameter than the inlet opening 11 of the mixing member 10. The drive head 12 is surrounded by the mixing chamber 14. The lateral inlet opening(s) 19 is/are arranged approximately at the height of the drive head 12 in the mixing chamber 14. Upstream from the mixing chamber 14, commonly an area with a narrowing of the cross-section or respectively a diffuser follows at whose end the outlet opening 18 of the mixing member 10 is located.

In the following, the proceeding of the method according to the invention for accelerated fermentation in a fermentation tank 2, in particular for the production of beer, shall be briefly explained.

At first, a fermentation fluid $M_1$ is sucked from the tank 2 by means of the circulation pump 30 via the first circulation pipe 40. This can be carried out, as shown in FIGS. 1-3, via an inlet 20 at the lowest point of the tank cone 2a or the cone-man-hole 3, respectively, or else via a tapping at any point of the tank wall (cone and frame). Subsequently, the drive fluid $M_1$ that is now pumped by the circulation pump 30 via the second circulation pipe 50 is injected into the mixing member 10 by means of the drive head 12 which is solidly assembled in the tank cone 2a. Since the drive fluid leaves the drive head 12 at a relatively high speed (it can be adjusted, for instance, by the shape of the injector or the diameter of the drive head 12, respectively) a dynamic pressure drop is generated in the area of the mixing chamber 14. The drive fluid $M_1$ is now mixed with further fermentation fluid (suction fluid) which, by means of the underpressure that is generated by the injection of the drive fluid $M_1$ via the one or more inlet openings 19 of the mixing member 10, is sucked directly into the mixing member 10, and, more precisely, to a mixed jet $M_{12}$ that passes upwards through the mixing member 10. Subsequently, the mixed jet $M_{12}$ comes out again through an outlet opening 18 of the mixing member 10 to enter the tank 2.

Commonly, the mixing member 10 is arranged in the tank 2 such that the mixed jet $M_{12}$ exits essentially vertically or centrally upwards, respectively, (i.e. in the same direction as the natural bubble column by the $CO_2$ generation) in order to optimally support the convention current in tank 2. Before coming out, the mixed jet $M_{12}$ is preferably further accelerated by a narrowing of the cross-section of the mixing member 10. This narrowing of the cross-section is commonly arranged in the form of a diffuser 16 upstream of the mixing chamber 14 and ensures a still further support of the convective current in the tank 2.

Preferably, the mixing member 10 is furthermore designed such that the volume flow $M_2$ (suction fluid) that is sucked through the inlet openings 19 of the mixing member 10 is in any case larger than the volume flow $M_1$ (drive fluid) that is pumped by the circulation pump 30. This ensures a gentle treatment of the yeast, and an energetically advantageous circulation pump 30 can be used for a correspondingly lower volume flow.

A further embodiment comprises a method for the accelerated fermentation in a fermentation tank, in particular for beer production with the steps a) suction of fermentation fluid ($M_1$) from the tank via a first circulation pipe by means of a circulation pump; b) inducing the drive fluid ($M_1$) that is now pumped by the circulation pump via a second circulation pipe into a mixing member, which is rigidly assembled in the tank cone; and c) generation of a jet directed upwardly leaving through an outlet opening of the mixing member, so that the yeast cells stay in suspension in the tank for a longer time due to the convective current improved in such manner; as well as a device for mixing a tank content comprising an outlet that can be arranged in a tank, an inlet that can be arranged in the tank outlet area, a circulation pump, a first circulation pipe connecting the inlet with the circulation pump and a second circulation pipe connecting the circulation pump with the outlet, wherein the outlet is realized as a jet pump.

Yeast cells that are already located in the cone area of the tank are sucked by the method and are pumped again into the upper tank region, so that the suspension time of the yeast cells and thus also the contact time of the yeast cells to the fermentation substrate is increased. The contact surface available for the fermentation is significantly increased by the increased number of yeast cells that are in suspension. In this manner, the metabolism processes of the yeast are positively supported and the process time is correspondingly shortened. The time effort for cooling the tank content from the temperature of warm-maturation to the temperature for the cool-maturation is also shortened. Zones with significantly diverting temperatures can be safely avoided by the constraint current that is generated by the mixing member.

Also the sedimentation process in the fermentation tank can be optimized in so far as smaller particles agglomerate with each other by the circulation in the tank and, in this manner, they can be sedimented in a better way. Hereby, in a subsequent filtration, comparatively small amounts of filtration means can be used. Also, the dosing of stabilizing means like silica gel, xero gel or bentonite can be kept in a lower range that also leads to a release of the subsequent filter arrangement. Also, the use of a target jet cleaner with moved parts can be omitted.

In such a device liquid is sucked from the tank through the inlet directly out of the tank outlet area of a tank via a first circulation pipe to a circulation pump, wherein the circulation pump pumps the fluid via a second circulation pipe again into the tank, where it is dispensed from an outlet again into the tank. The outlet is located inside the tank and, according to the invention, is realized as jet pump. Thus, the outlet does not comprise any moveable parts and nevertheless provides a good and safe mixing of the tank content.

This good mixing is in particular given by the use of a jet pump as an outlet. The jet pump sucks fluid from the tank and provides inside the jet pump a mixing of the sucked tank content and the fluid that is pumped by the jet pump. At the same time, a current is generated in the entire tank by the jet pump, which provides an additional mixing of the pump content. Thus, the jet pump has on the one hand the combinatory effect to provide a current in the tank overall and on the other hand to carry out a mixing of at least two fluid streams of the tank content in itself.

By means of such a device and the in particular good mixing of the tank content, smaller pump pressures are needed so that the tank content is treated gently. In a preferred embodiment of the method, in step b), the drive fluid ($M_1$) that is now pumped by the circulation pump via a second circulation pipe, is injected into a mixing member by means of a drive head, which is rigidly assembled in the tank cone, wherein the drive fluid ($M_1$) is mixed with further fermentation fluid ($M_2$) that is sucked by means of the underpressure generated by the injection of the drive fluid ($M_1$) via one or more inlet openings of the mixing member directly into the mixing member to a mixed jet ($M_{12}$) that passes the mixing member upwards; and in step c), the mixed jet ($M_{12}$) that is directed upwards leaves through an outlet opening of the mixing member, so that the yeast cells stay in suspension in the tank for a longer time due to the convective current improved in such manner. Herewith, a more gentle yeast treatment is ensured and pumps with lower power can be used.

Preferably, the mixing member is arranged in the tank such that the jet and the mixed jet ($M_{12}$), respectively, in step c) leave essentially vertically. Herewith, an additional support of the natural convective current in the tank is achieved by the fact that the mixed jet is centrally directed upwards and thus comprises the same direction as the natural bubble column that is generated by the $CO_2$-generation.

In a further embodiment of the method, measurement devices for the online/inline-detection of quality parameters (like for instance extract, ethanol, pH-value, clouding, temperature, diacetyl etc.) are arranged in the first and/or the second circulation pipe. This measure is based on the consideration that, by the increased volume flow in both circulation pipes, the tank content is revolved several times during the fermentation process. Ideally, a complete circulation of the tank content lasts between 3 and 12 hours, more preferably between 4 and 10 hours. The measurement signals that are recorded hereby can be used for an optimized process control.

In a further embodiment of the method, the jet and the mixed jet ($M_{12}$), respectively, are accelerated before the leaving in step c) by a narrowing of the cross section of the mixing member. Thereby, the natural convective current in the tank can be further supported.

In a further embodiment of the method, the volume flow ($M_2$) that is sucked through the inlet openings of the mixing member is always larger than the volume flow ($M_1$) that is pumped by the circulation pump. The used mixing member is in general designed in that about ¾ of the volume flow ($M_{12}$) is sucked directly from the tank into the mixing member (volume flow $M_2$) and only about ¼ of the volume flow ($M_{12}$) is pumped by the circulation pump (volume flow $M_1$). In this manner, the mechanical load of the yeast (for instance through the shear forces coming up in the circulation pipes or the pump) can be significantly reduced. Thus, also due to the lower pressure losses at the mixing member, a relatively small pump can be used that uses less energy.

Preferably, the mixing member is moreover realized as Venturi-injector or as jet-pump, respectively. The difference between these two alternatives lies in general in that for the jet-pump, respectively, the directly sucked fluid generally enters the mixing member upstream from the narrowing of the cross-section and for the Venturi-injector in the area of the narrowing of the cross-section. Generally due to the slightly better mixing conditions the jet-pump, respectively, is to be preferred. However, the selection depends on the specific individual case.

In a further embodiment of the method, the suction of the fermentation fluid in step a) is carried out from the lowest point of the tank cone. This processing offers the advantage that here a particularly high concentration of yeast cells is present, which can be brought into suspension again. With the term fermentation fluid, in the present case, the mixture of yeast cells and fermentation substrate (gyle) in the fermentation tank is described.

In still a further embodiment of the method, the suction of the fermentation fluid in step a) is carried out from any arbitrary point in the tank cone. The yeasts used in the brewing industry react, as a rule, negatively to the shear load during the fermentation process. In order to reduce the shear loads through the circulation, also a tapping in the tank cone can therefore be provided (preferably near the bottom, so that only a small quantity of swamp or no swamp at all remains). Here, the fermentation fluid with a somewhat lower yeast concentration can then be sucked and revolved.

In an embodiment of the device, the jet pump comprises a drive injector, which is connected with the second circulation pipe, a mixing chamber, which is arranged downstream of the drive injector, with at least one suction opening for sucking fluid from the tank and mixing it with the drive fluid flowing through the drive injector, and a diffuser downstream of the mixing chamber comprising an outlet opening for dispensing the mixed fluids into the tank. The drive fluid, which is taken from the tank content, flows through the drive injector and generates a fast-flowing current in the diffuser that generates an underpressure in the mixing chamber. Due to this underpressure, fluid is sucked through at least one suction opening from the tank into the mixing chamber, is mixed with the drive fluid in the mixing chamber and in the subsequent diffuser and is again dispensed into the tank through an outlet opening at the end of the diffuser. Contrary to an injector that is commonly arranged in the tank, here, a suction of fluid is carried out from the tank into the inside of the jet pump, whereby then a constraint mixing of this sucked fluid with the drive fluid is carried out in the mixing chamber. The mixing is thus substantially more intensive than in the case of a mere generation of a current in the tank.

In a further embodiment of the device, the device comprises one or more valves that are connected to the first circulation pipe. Due to these valves, it is possible to carry out a hydraulic connection of the tank to pipes. Via these valves, the tank can be filled, emptied or cleaned. Moreover, it is possible to add different fluids that will then be mixed by the device in the tank.

In a further embodiment of the device, the valves comprise valve housings that are directly connected to the wall of the first circulation pipe. Through this arrangement of the valve housings, dead space in the area of the valves is avoided. Therefore, in the area of the valves, no fluids can accumulate that do not take part in the material exchange. Thus, the microbiological quality of the device is improved.

In another embodiment of the device, the valves are mix-proof valves, in particular double-seated valves. Mix-proof valves and in particular double-seated valves reliably prevent, also in case a valve-seat is leaking, that fluids mix undesirably inside the device with fluids that are present at other valves. In double-seated valves, a leakage that cannot be excluded completely can flow into the environment.

In still another embodiment of the device, at least two of the valves are connected oppositely to the first circulation pipe. By oppositely connected valves, a particularly space-saving arrangement is obtained, so that a large number of valves can be connected to the first circulation pipe.

In a further preferred embodiment of the device, the valves are connected to a pipe that is arranged essentially horizontally. If the device and thus the tank that is connected thereto is connected via valves to pipes that are arranged essentially horizontally, a tank storage system can be built thereby, wherein the pipes are directed continuously along all tanks and are connected to the devices according to the invention. Thus, a clear, space-saving and—in view of the cleaning—optimum matrix structure is achieved by which all desired interconnecting options between the tanks or all desired filling- and emptying-possibilities, respectively, are provided. Valve fields, distributor panels or pipe arc distributors that were often necessary in the past are thus not necessary anymore.

In yet another preferred embodiment of the device, the first circulation pipe comprises three straight arms arranged in a U-shape which are connected with each other via arcs.

In another preferred embodiment of the device, opposing pairs of valves are arranged at a vertically arranged arm of the first circulation pipe and/or at a horizontal arm. According to the local conditions, the connections of the pipes can be carried out via valves at arbitrary positions at the circulation pipes, in particular the first circulation pipe.

In a further preferred embodiment of the device, the second circulation pipe comprises an area that extends into the lower area of a tank. Thus, the jet pump serving in parallel as outlet and as mixing device can be arranged at a desired height inside a tank.

In a further preferred embodiment of the device, the area of the second circulation pipe extending into the tank comprises a length of 350 mm-1800 mm, preferably 375 mm-1650 mm, and even more preferred of 400 mm-1500 mm. Thus, the jet pump is preferably arranged in the lower half of the tank, in particular in the lower third of the tank.

In yet another preferred embodiment of the device, the inlet is realized as a hollow part through which the second circulation pipe extends into the inside of the tank. Correspondingly, there is only one connection of the device to the tank, namely at the lowest end of the tank. The fluid is sucked through the hollow part at the lowest end of the tank of the tank and is pumped by means of the pump through the second circulation pipe and through the hollow part into the tank. There, it reaches the jet pump according to the invention that causes a mixing of the pumped fluid with a fluid from the tank.

REFERENCE SIGNS

1 Device for mixing a tank content
2 Tank
2a Tank cone
3 Cone-man-hole
4 (Lower) Connection flange
4a Upper flange
10 Mixing member
11 Inlet opening
12 Drive head/Drive injector
13 Internal thread
14 Mixing chamber
16 Diffuser
18 Outlet opening
19 Suction opening(s)/inlet opening(s)
20 Inlet
22 Flap valve
24 Flap valve
26 Flap valve
30 Circulation pump
40 First circulation pipe
41 Continuation of the first circulation pipe
42 Horizontally arranged arm
43 Arc 44 Vertically arranged arm
45 Arc
46 Horizontally arranged arm
50 Second circulation pipe
52 Section of the second circulation pipe that extends into the tank
53 U-shaped area of the second circulation pipe
54 Valves or measurement devices
62, 63, 64, 65 Pairs of valves
70 Pipes
$M_1$ Fermentation fluid/drive fluid sucked in or pumped by the pump, respectively
$M_2$ Fermentation fluid sucked in directly into the mixing member
$M_{12}$ Mixed jet

The invention claimed is:

1. Device (i) for mixing a content of a tank (2) with at least a tank cone (2a), the tank cone (2a) having a bottom end and a connection flange (4), the device (1) comprising:
   a. a mixing member (m) arranged in the tank cone (2a);
   b. an inlet (20) in fluid communication with the tank (2) proximal the bottom end of the tank cone (2a);
   c. a circulation pump (30);
   d. a first circulation pipe (40) connecting the inlet (20) with the circulation pump (30); and
   e. a second circulation pipe (50) connecting the circulation pump (30) with the mixing member (10),
   f. the mixing member comprising a drive head (12) that is connected to the second circulation pipe (50) and a mixing chamber (14) surrounding the drive head (12), the mixing chamber (14) having at least one inlet opening (19) opening into the tank, the inlet opening (19) being displaced vertically upward from the inlet (20), whereby the inlet opening (19) draws fluid from the tank (2) and mixes it with the drive fluid flowing through the drive head (12) to form a mixture, the mixing member (m) being arranged within the tank cone (2a) so that a lowermost surface of inlet opening (19) is at a height (L) of at least 350 mm above the bottom end of the tank cone (2a); and
   g. wherein the mixing member comprises an outlet opening in the tank for ejecting the mixture into the fluid content of the tank.

2. Device according to claim 1, wherein:
   the mixing member (10) is arranged within the tank cone (2a) so that a lowermost surface of inlet opening (19) is at a height (L) of at least 375 mm above the bottom end of the tank cone (2a).

3. Device according to claim 1, wherein the mixing member (10) further comprises:
   a. a diffuser (16) that is arranged downstream the mixing chamber (14) comprising an outlet opening (18) for dispensing the mixed fluids into the tank (2).

4. Device according to claim 1, further comprising one or more valves (62, 63, 64, 65) that are connected to the first circulation pipe (40).

5. Device according to claim 1, wherein the mixing member (10) is a unitary welded module.

6. Device according to claim 1, wherein the mixing member (10) is a jet pump.

7. Device according to claim 1, wherein the inlet (20) is a hollow part, through which the second circulation pipe (50) extends inside the tank (2).

8. Device according to claim 1, wherein:
   the mixing member (w) is arranged within the tank cone (2a) so that a lowermost surface of inlet opening (19) is at a height (L) of at least 400-1500 mm above the bottom end of the tank cone (2a).

* * * * *